US009427795B2

(12) United States Patent
Morii et al.

(10) Patent No.: US 9,427,795 B2
(45) Date of Patent: Aug. 30, 2016

(54) METHOD FOR PRODUCING A HOLLOW ENGINE VALVE

(71) Applicants: MITSUBISHI HEAVY INDUSTRIES MACHINE TOOL CO., LTD., Ritto-shi, Shiga (JP); YOSHIMURA COMPANY, Nagoya-shi, Aichi (JP)

(72) Inventors: Hirokazu Morii, Tokyo (JP); Kenichiro Hirao, Tokyo (JP); Katsumi Nakamura, Tokyo (JP); Hyoji Yoshimura, Nagoya (JP)

(73) Assignee: Fuji Hollow Valve Inc., Shizuoka (JP)

( * ) Notice: Subject to any disclaimer, the term of this patent is extended or adjusted under 35 U.S.C. 154(b) by 0 days.

(21) Appl. No.: 14/369,385

(22) PCT Filed: Jan. 21, 2013

(86) PCT No.: PCT/JP2013/051048
§ 371 (c)(1),
(2) Date: Jun. 27, 2014

(87) PCT Pub. No.: WO2013/114989
PCT Pub. Date: Aug. 8, 2013

(65) Prior Publication Data
US 2014/0366373 A1    Dec. 18, 2014

(30) Foreign Application Priority Data
Jan. 30, 2012   (JP) ................................. 2012-017203

(51) Int. Cl.
*B23P 15/00*    (2006.01)
*B21K 1/22*     (2006.01)
(Continued)

(52) U.S. Cl.
CPC ................ *B21K 1/22* (2013.01); *B23P 15/002* (2013.01); *F01L 3/12* (2013.01); *F01L 3/14* (2013.01); *F01L 2103/00* (2013.01); *Y10T 29/49309* (2015.01)

(58) Field of Classification Search
CPC .......... B21K 1/22; B23P 15/002; F01L 3/14; F01L 3/20; Y10T 29/49309
See application file for complete search history.

(56) References Cited

U.S. PATENT DOCUMENTS 5,056,219 A    10/1991   Iwase

FOREIGN PATENT DOCUMENTS

| CH | 240 643 A     | 1/1946 |
|----|---------------|--------|
| CN | 102159799 A   | 8/2011 |

(Continued)

OTHER PUBLICATIONS

International Search Report and Written Opinion of the International Searching Authority mailed Feb. 26, 2014 with an English translation.

(Continued)

*Primary Examiner* — Sarang Afzali
*Assistant Examiner* — Ruth G Hidalgo-Hernande
(74) *Attorney, Agent, or Firm* — Birch, Stewart, Kolasch & Birch, LLP

(57) ABSTRACT

The present invention provides a method for producing a hollow engine valve, with which the production process can be simplified and the processing precision can be improved. To this end, the present invention provides a method for producing a hollow engine valve (1) which is provided with a valve main body (10) in which a hollow hole (10c) is formed along a valve umbrella part (10a) and a hollow shaft part (10b), wherein a solid round bar (11) forming the material of the valve main body (10) is molded to a semi-finished article (12) by means of a single hot-forging process, the semi-finished article (12) is subjected to rotary swaging whereby the semi-finished article (12) is molded into a semi-finished article (13), the semi-finished article (13) is subjected to necking whereby the semi-finished article (13) is molded into the valve main body (10), and a shaft end sealing member (20) is joined to the end part of the hollow shaft part (10b) of the valve main body (10).

6 Claims, 7 Drawing Sheets

(51) Int. Cl.
  *F01L 3/14* (2006.01)
  *F01L 3/12* (2006.01)

(56) References Cited

FOREIGN PATENT DOCUMENTS

| EP | 2 325 446 | A1 | 5/2011 | | | |
|---|---|---|---|---|---|---|
| GB | 563 795 | A | 8/1944 | | | |
| JP | 3-242408 | A | 10/1991 | | | |
| JP | 3-264714 | A | 11/1991 | | | |
| JP | 2009-185655 | A | 8/2009 | | | |
| JP | 4390291 | B1 | 10/2009 | | | |
| JP | 2011-179328 | A | 9/2011 | | | |
| WO | WO 2010/032799 | A1 | 3/2010 | | | |
| WO | WO 2011/104903 | A1 | 9/2011 | | | |
| WO | WO 2011104903 | A1 | * | 9/2011 | ............ | B21D 41/045 |
| WO | WO 2011104916 | A1 | * | 9/2011 | ............ | B21C 23/183 |

OTHER PUBLICATIONS

Official Action issued Oct. 29, 2015 in Korean Application No. 10-2014-7017636 with English Translation.
Extended European Search Report dated Jun. 30, 2015 issued in European Application No. 13 74 2918.
Chinese Office Action issued Oct. 29, 2015 in corresponding Chinese Application No. 201380004333.5 with English translation.

* cited by examiner

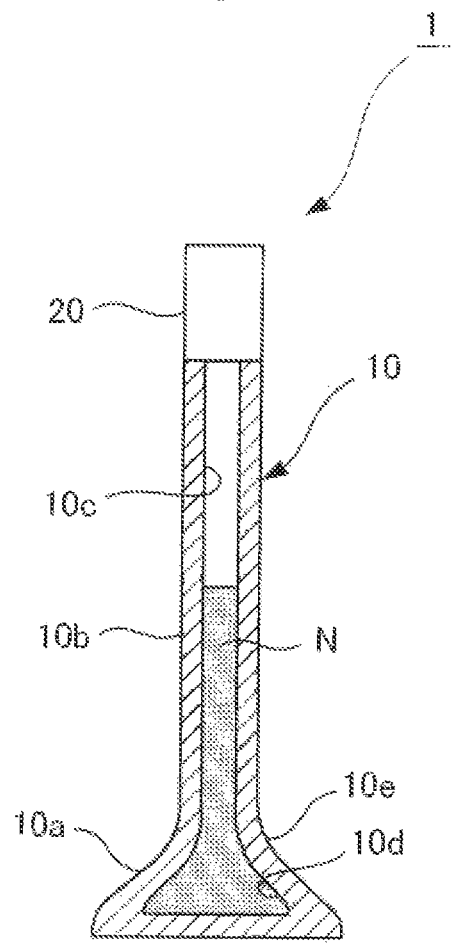

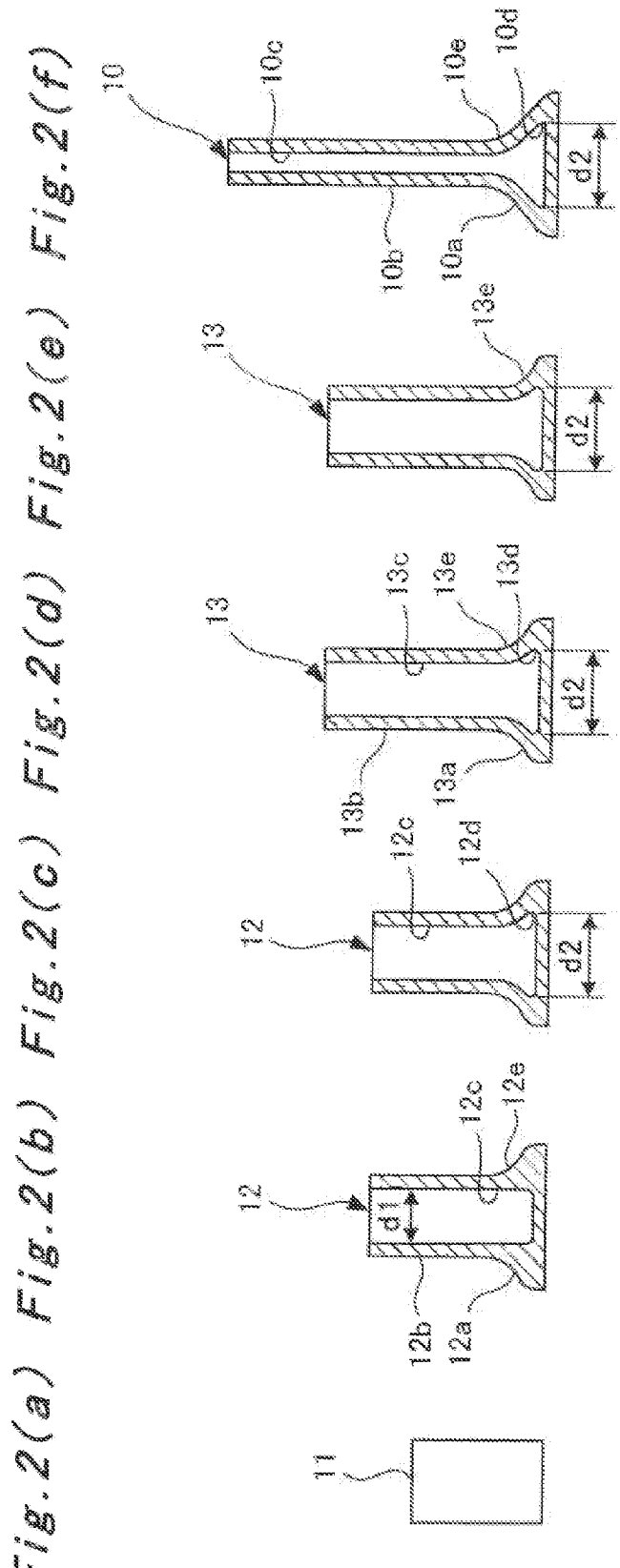

METHOD FOR PRODUCING A HOLLOW ENGINE VALVE

TECHNICAL FIELD

The present invention relates to a method for producing a hollow engine valve including a valve body in which a hollow hole extending through a valve umbrella portion and a hollow stem portion connected to the valve umbrella portion is formed.

BACKGROUND ART

Among engine valves, various engine valves in which insides thereof are formed to be hollow are recently provided along with the increase in output and performance of an engine. This design reduces the weight of a hollow engine valve as compared to that of a solid engine valve and enables a highly-accurate valve opening and closing operation to be performed. A conventional method for producing such a hollow engine valve is disclosed in, for example, Patent Document 1.

PRIOR ART DOCUMENT

Patent Document

Patent Document 1: Japanese Patent No. 4390201

SUMMARY OF THE INVENTION

Problems to be Solved by the Invention

In the conventional method for producing a hollow engine valve, a valve body, a hollow stem member, and a stem end sealing member are separately produced and then these members are joined together to obtain the hollow engine valve which is a finished product. Furthermore, out of these members, the valve body is produced in the following method. A solid round bar which is a raw material is shaped into a semi-finished product by performing forging twice and then the semi-finished product is subjected to a necking process (drawing process) to be shaped into the valve body.

However, as described above, in the conventional forging step, the forging needs to be performed twice on the solid round bar. Specifically, the solid round bar is shaped into a glass-shaped intermediate product in the first forging and then the intermediate product is shaped into the semi-finished product in the second forging.

Furthermore, in the second forging, a lower end portion of the intermediate product is forged to be expanded outward and is thereby shaped into a valve umbrella portion of the semi-finished product. To perform such forging, shaping needs to be performed with a core inserted in a hollow hole of the glass-shaped intermediate product. In a case where the shaping is performed with the core being inserted as described above, the core needs to be inserted in the hollow hole of the intermediate product shaped in the first forging, in the process of expanding the lower portion of the intermediate product outward. The outer diameter of the core is thus inevitably smaller than the inner diameter of the hollow hole in the intermediate product. Since the outer diameter of the core is smaller than the inner diameter of the hollow hole in the intermediate product, a step may be formed in the hollow hole.

Such a step tends to be formed particularly when the semi-finished product of the valve body is shaped by hot forging. Moreover, the step not only causes drawing failure in the necking process which is the subsequent step, bar also becomes a strength reduced portion which receives concentration of stress in usage of the hollow engine valve.

Moreover, a setting range of the inner diameter of the hollow stem portion (hollow hole) of the valve body to be shaped in the necking process is determined to some extent by the inner diameter of the hollow stem portion (hollow hole) of the semi-finished product at the start of the necking process. Furthermore, since the thickness of the hollow stem portion in the semi-finished product monotonically increases in the necking process, a setting range of the thickness of the hollow stem portion in the valve body which is the finished product is determined to some extent by the thickness of the hollow stem portion of the semi-finished product at the start of the necking process. Accordingly, the conventional production method has difficulty in producing a valve body (hollow engine valve) of desired dimensions.

The present invention has been made to solve the problems described above, and an object thereof is to provide a method for producing a hollow engine valve which can simplify production steps and improve processing accuracy.

Means for Solving the Problem

A method for producing a hollow engine valve according to a first aspect of the present invention for solving the problems described above is a method for producing a hollow engine valve including a valve body in which a hollow hole extending through a valve umbrella portion and a hollow stem portion connected to the valve umbrella portion is formed, characterized in that the method comprises:

shaping a solid round bar which is a raw material of the valve body into a valve body semi-finished product in which a semi-finished product hollow hole is formed, by performing hot forging once, the semi-finished product hollow hole corresponding to the hollow hole and extending through a semi-finished product valve umbrella portion corresponding to the valve umbrella portion and a semi-finished product hollow stem portion corresponding to the hollow stem portion;

subjecting the valve body semi-finished product to a rotary swaging process in which an outer peripheral surface of the semi-finished product hollow stem portion is pressed while the valve body semi-finished product is rotated, and thereby reducing a diameter of the semi-finished product hollow stem portion and increasing a stem length of the semi-finished product hollow stem portion;

subjecting one valve body semi-finished product subjected to the rotary swaging process to a necking process in which the semi-finished product hollow stem portion and a semi-finished product neck portion being a connection portion between the semi-finished product valve umbrella portion and the semi-finished product hollow stem portion are drawn stepwise, and thereby reducing the diameter of the semi-finished product hollow stem portion and increasing the stem length of the semi-finished product hollow stem portion to shape the valve body semi-finished produce into the valve body; and joining a stem end sealing member to an end portion of the hollow stem portion in the valve body to seal the hollow hole.

The method for producing a hollow engine valve according to a second aspect of the present invention for solving the problems described above is characterized in that a semi-finished product enlarged-diameter hole portion having an inner diameter larger than an inner diameter of the semi-finished product hollow hole is processed at a lower end of the semi-finished product hollow hole in the semi-finished product valve umbrella portion.

The method for producing a hollow engine valve according to a third aspect of the present invention for solving the problems described above is characterized in that the semi-finished product neck portion is processed to have a predetermined thickness before the necking process.

The method for producing a hollow engine valve according to a fourth aspect of the present invention for solving the problems described above is characterized in that the stem end sealing member is joined to the end portion of the hollow stem portion after metallic sodium as a coolant is put into the hollow hole.

Effect of the Invention

In the method for producing the hollow engine valve according to the present invention, the solid round bar which is the raw material of the valve body is shaped into the valve body semi-finished product by performing hot forging once, and the valve body semi-finished product is subjected to the rotary swaging process and the necking process to be shaped into the valve body which is the finished product. This can simplify production steps and improve processing accuracy.

BRIEF DESCRIPTION OF THE DRAWINGS

FIG. 1 is a vertical cross-sectional view of hollow engine valve produced in a method for producing a hollow engine valve in one embodiment of the present invention.

FIG. 2 Parts (a) to (f) are views showing, in sequence, processes for shaping a solid round bar into a valve body.

MODE FOR CARRYING OUT THE INVENTION

Figure 3A:
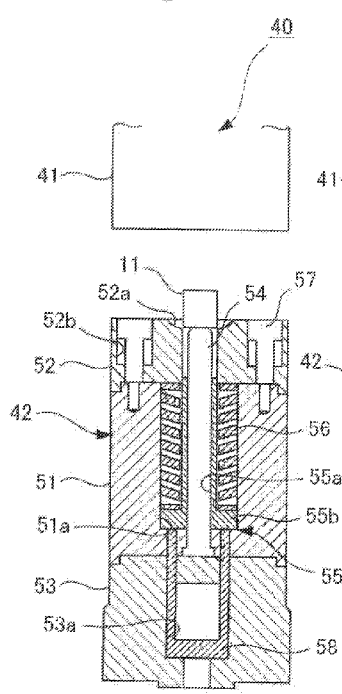
FIG. 3 is a schematic configuration view of a press die for hot forging and parts (a) to (d) are views showing, in sequence, operations for shaping the solid round bar into a semi-finished product.
Figure 3B:
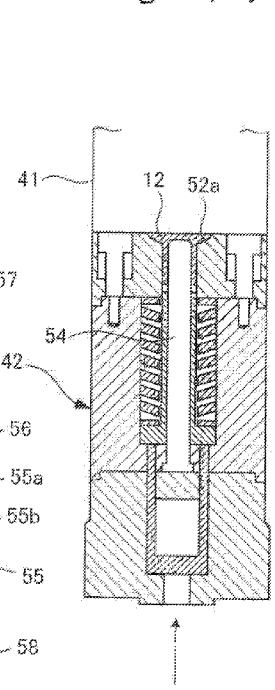
Figure 3C:
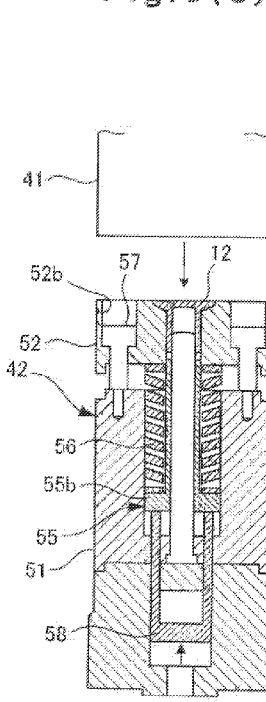
Figure 3D:
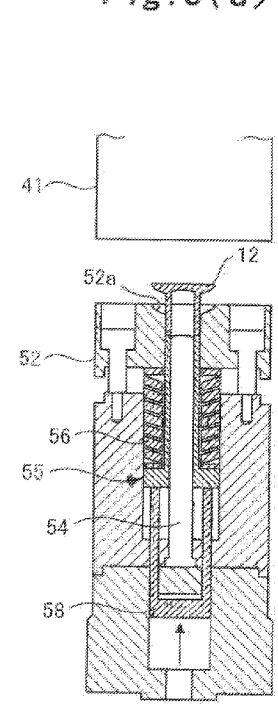

A method for producing a hollow engine valve of the present invention is described below in detail by using the drawings.

Embodiment

As shown in FIG. 1, a hollow engine valve 1 produced by the production method of the present invention is used as an intake valve or an exhaust valve of an engine in a vehicle or the like, and includes a hollow-shaft-shaped valve body 10 and a shaft-shaped stem end sealing member 20. The valve body 10 and the stem end sealing member 20 are joined to each other at stem ends thereof.

Moreover, as shown in FIG. 1 and part (f) of FIG. 2, the valve body 10 has an umbrella-shaped valve umbrella portion 10a and a hollow-shaft-shaped hollow stem portion 10b. A hollow hole 10c is formed in the valve body 10 along outer shapes of the valve umbrella portion 10a and the hollow stem portion 10b, extending through the valve umbrella portion 10a and the hollow stem portion 10b. A hollow hole 10c can be filled with metallic sodium N as a coolant.

Furthermore, an enlarged-diameter hole portion 10d is formed at a lower end of the hollow hole 10c in the valve umbrella portion 10a and the inner diameter d2 of the enlarged-diameter hole portion 10d at a largest portion is larger than the inner diameter of the hollow hole 10c. A neck portion 10e is formed between the salve umbrella portion 10a and the hollow stem portion 10b.

For example, heat resistant steels such as SUH 1, SUH 3, SUH 11, SUH 35, and SUH 38 can be employed as materials of the valve body 10 and the stem end sealing member 20.

Next, the method for producing the hollow engine valve 1 is described in detail by using FIGS. 1 to 7.

As shown in parts (a) to (f) of FIG. 2, a solid round bar 11 which is a raw material of the valve body 10 is subjected to hot forming to be shaped into a semi-finished product 12; then, the semi-finished product 12 is sequentially subjected to a cutting process on a hollow hole 12c in a valve umbrella portion 12a, a rotary swaging process (cold forging process) on a hollow stem portion 12b, a cutting process (turning process) on a neck portion 13e, and a necking process (drawing process) on a hollow stem portion 13b and the neck portion 13e, and the shape of the semi-finished product 12 is thereby changed to the shape of a semi-finished product 13; thereafter, the semi-finished product 13 is finally shaped to the valve body 10. It is preferable from the view point of processing accuracy that the aforementioned necking process is, in principle, cold forging in which the semi-finished product 13 is maintained at normal temperature. However, depending on the processability of the raw material, the necking process may be forging performed in a state where the semi-finished product 13 is heated.

First, as shown in parts (a) and (b) of FIG. 2 and parts (a) to (d) of FIG. 3, the solid round bar 11 formed in a predetermined shape in advance is shaped into the semi-finished product 12 by using a press die 40 for hot forging.

As shown in part (a) of FIG. 3, the press die 40 includes a columnar upper die (punch) 41 and a cylindrical lower die 42. Out of these dies, the lower die 42 includes a die block 51, a floating die 52, and a cylinder block 53. The floating die 52 and the cylinder block 53 are provided respectively above and below the die block 51.

A cylindrical housing portion 51a is formed in a center portion of the die block 51 to penetrate the die block 51 in an up-down direction. Furthermore, a core 54 is disposed in the housing portion 51a to penetrate the housing portion 51a in the up-down direction. In this case, the core 54 is supported between the housing portion 51a and a top surface of the cylinder block 53 in such a way that movement of the core 54 in an axial direction (up-down direction) thereof is restricted.

Moreover, a cylindrical knock-out pin 55 is disposed in the housing portion 51a and the core 54 is inserted in a hollow hole 55a of the knock-out pin 55. A flange portion 55b is formed at a lower end of the knock-out pin 55 and is supported to be slidable in the up-down direction in the housing portion 51a.

Furthermore, multiple springs 56 are provided between an inner peripheral surface of the housing portion 51a and an outer peripheral surface of the knock-out pin 55. These springs 56 are interposed between a bottom surface of the floating die 52 and the flange portion 55b of the knock-out pin 55 in a compressed state.

A cavity 52a is formed in a center portion of the floating die 52 to penetrate the floating die 52 in the up-down direction. An upper end of the core 54 is disposed in a center portion of the cavity 52a and an upper end of the knock-out pin 55 disposed outside the core 54 in a radial direction is capable of advancing into the cavity 52a from below the cavity 52a.

Moreover, multiple pin slide holes 52b are provided in an outer peripheral portion of the floating die 52 along a circumferential direction thereof. These pin slide holes 52b are formed to penetrate the floating die 52 in the up-down direction. Furthermore, slide pins 57 are slidably supported in the pin slide holes 52b and lower ends or the slide pins 57 are fixed to an upper portion of the die block 51.

Meanwhile, a cylinder portion 53a is formed in a center portion of the cylinder block 53 and a piston member 58 is supported in the cylinder portion 53a to be slidable in the up-down direction. An upper end of the piston member 58 penetrates an upper portion of the cylinder block 53 and a lower portion of the die block 51 and can press a bottom surface of the flange portion 55 in the housing portion 51a.

In the case of shaping the solid round bar 11 into the semi-finished product 12 by using the press die 40, as shown in part (a) of FIG. 3, the lower die 42 is first lowered to a lower-limit position and then the solid round bar 11 heated to a predetermined temperature is placed on an upper end surface of the core 54 disposed in the cavity 52a.

Note that the solid round bar 11 is heated in advance to a temperature of, for example, 950° C. to 1200° C. before the hot forging. Moreover, when the solid round bar 11 heated to a temperature within the aforementioned temperature range is placed on the upper end surface of the core 54, an upper half or more of the solid round bar 11 protrudes upward from an inside of the cavity 52a.

Furthermore, since the piston member 58 is positioned at a lower-limit position in the cylinder portion 53a at the start of the aforementioned hot forging (at the start of moving of the press die 40), the knock-out pin 55 is also disposed at a lower-limit position in the housing portion 51a. Hence, a top surface of the die block 51 and the bottom surface of the floating die 52 are in tight contact with each other.

Next, as shown in part (b) of FIG. 3, the lower die 42 is lifted from the lower-limit position until it comes into contact with the upper die 41. The solid round bar 11 is thereby pressed downward into the cavity 52a by the upper die 41 to cover the upper end of the core 54. Specifically, the solid round bar 11 is made to fill a space surrounded by the upper die 41, the cavity 52a, and the core 54, and is thus shaped into the semi-finished product 12.

Thereafter, as shown, in part (c) of FIG. 3, the lower die 42 is lowered to the lower-limit position and then the piston member 58 is moved upward. The flange portion 55b of the knock-out pin 55 is thereby pressed upward by the piston member 53. Accordingly, the floating die 52 is lifted by biasing force of the springs 56 and is spaced way from the die block 51. At this time, when a lifting amount of the floating die 52 reaches a predetermined lifting amount, one pin slide holes 52b and the slide pins 57 come into contact with one another and the lifting of the floating die 52 is restricted.

Next, as shown in part (d) of FIG. 3, when the piston member 58 is moved further upward, only the knock-out pin 55 is lifted against the biasing force of the springs 56. The semi-finished product 12 fitted into the cavity 52a of the floating die 52 is thereby pushed upward by the knock-out pin 55. Specifically, the semi-finished product 12 shaped in the cavity 52a is separated from the core 54 and is pushed out from the cavity 52a by the pressing of the knock-out pin 55 from below.

Performing the hot forging of the solid round bar 11 with the press die 40 as described above allows the solid round bar 11 to be shaped into the semi-finished product 12 by performing forging once. In this case, as shown in part (b) of FIG. 2, the hollow hole 12c in the shaped semi-finished product 12 is formed to have an inner diameter of d1.

Moreover, shaping the solid round bar 11 into the semi-finished product 12 by performing forging once can prevent the aforementioned generation of the step formed in the case where the solid round bar is shaped into the semi-finished product by performing forging twice. This can not only simplify the forging step but also improve the strength of the valve body 10 (hollow engine valve 1).

Furthermore, since the lower die 42 of the press die 40 employs a floating structure in which the floating die 52 is made to float by the springs 56, a press speed (moving speed of the lower die 42) can be adjusted by adjusting the biasing force of the springs 56. Due to this, when the solid round bar 11 is shaped into the semi-finished product 12, there are exerted effects similar to those obtained in a case of using a die for shaping which is performed with back pressure being generated. Accordingly, the solid round bar 11 can be made to dividedly flow to the valve umbrella portion 12a side and the hollow stem portion 12b side in the semi-finished product 12. As a result, the semi-finished product 12 shaped by the press die 40 employing the floating structure can be greatly improved in shapability, compared to a semi-finished product shaped by a press mold having no floating structure.

Figure 4:
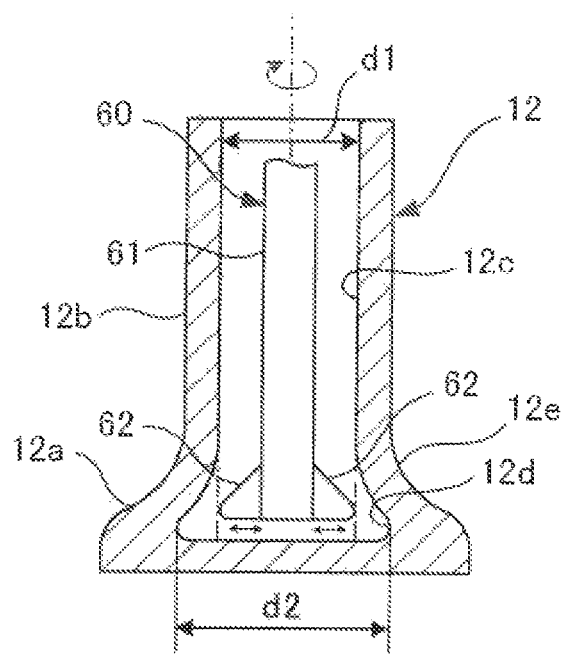
FIG. 4 is view showing a cutting process performed on a hollow hole of the semi-finished product.

Next, as shown in parts (b) and (c) of FIG. 2 and FIG. 4, the hollow hole 12c of the semi-finished product 12 obtained by the hot forging is subjected to the cutting process by using a cutting tool 60.

Specifically, as shown in FIG. 4, the cutting tool 60 is first prepared. The cutting tool 60 includes a shaft-shaped tool main body 61 and multiple cutting edges 62 provided at a front end of the tool main body 61. Moreover, the cutting edges 62 are supported to be capable of advancing outward in a radial direction of the tool main body 61.

Next, the front end side of the cutting cool 60 is inserted into the hollow hole 12c of the semi-finished product 12 and the cutting tool 60 is then moved in a tool rotating axis direction while being rotated. At the same time, the cutting edges 62 are gradually moved outward in a tool radial direction. A lower end of the hollow hole 12c is thereby cut by the cutting edges 62 and an enlarged-diameter hole portion 12d is formed in the lower end.

At this time, as shown in part (c) of FIG. 2 and FIG. 4, the enlarged-diameter hole portion 12d is formed such that the inner diameter thereof gradually becomes larger toward a bottom surface. The inner diameter d2 of the enlarged-diameter hole portion 12d at a largest portion is larger than the inner diameter d1 of the hollow hole 12c.

In summary, as shown in part (b) of FIG. 2, the valve umbrella portion 12a, the hollow stem portion 12b, the hollow hole 12c which extends through the valve umbrella portion 12a and the hollow stem portion 12b, and a neck portion 12e which is a connection portion between the valve umbrella portion 12a and the hollow stem portion 12b are formed in the semi-finished product 12 subjected to the hot forging. Furthermore, as shown in part (c) of FIG. 2, the enlarged-diameter hole portion 12d is formed at the lower end of the hollow hole 12c in the valve umbrella portion 12a in the semi-finished product 12 subjected to the cutting process.

The valve umbrella portion (semi-finished product valve umbrella portion) 12a, the hollow stem portion (semi-finished product hollow stem portion) 12b, the hollow hole (semi-finished product hollow hole) 12c, the enlarged-diameter hole portion (semi-finished product enlarged-diameter hole portion) 12d, and the neck portion (semi-finished product neck portion) 12e in the semi-finished product 12 correspond respectively to the valve umbrella portion 10a, the hollow stem portion 10b, the hollow hole 10c, the enlarged-diameter hole portion 10d, and the neck portion 10e in the valve body 10 which is a finished product.

Figure 5A:
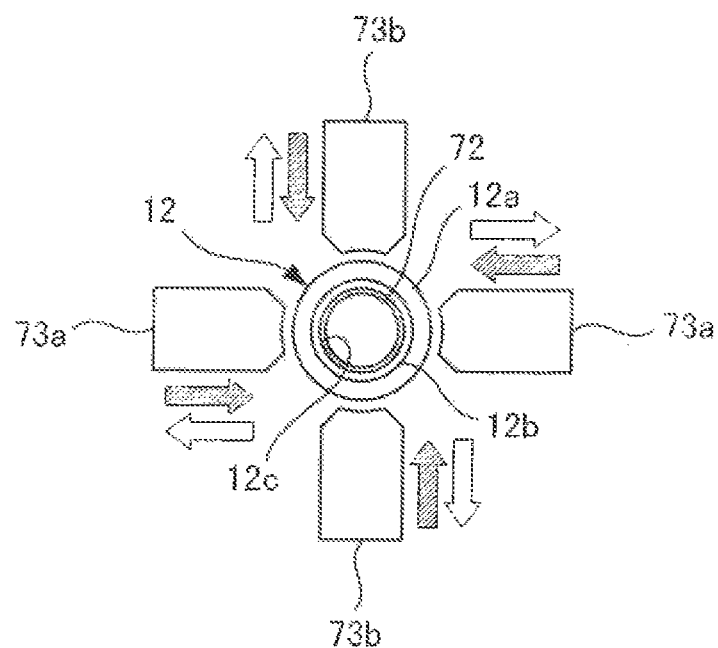
FIG. 5 is a schematic configuration view of a rotary swaging machine, part (a) is a plan view of the rotary swaging machine, and part (b) is a side view of the rotary swaging machine.
Figure 5B:
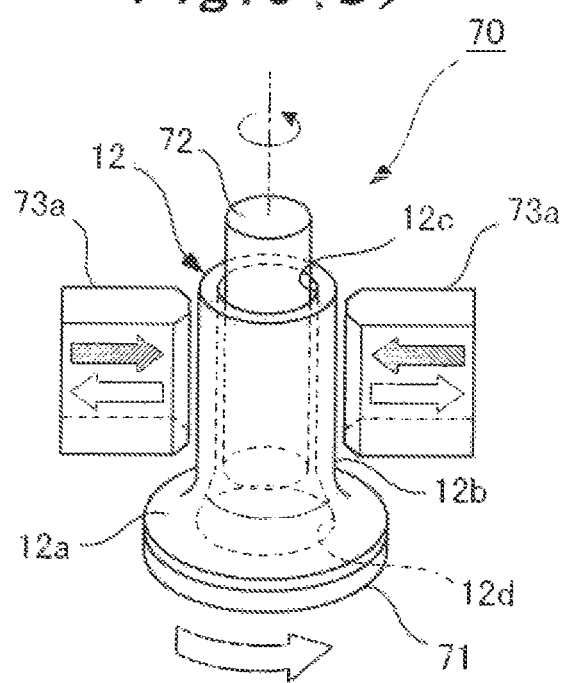

Next, as shown in parts (c) and (d) of FIG. 2 and parts (a) and (b) of FIG. 5, the semi-finished product 12 obtained by the cutting process is shaped into the semi-finished product 13 by using a rotary swaging machine 70 for cold forging.

As shown in parts (a) and (b) of FIG. 5, the rotary swaging machine 70 includes a rotating table 71, a core 72, and dies 73a, 73b.

The rotating table 71 is supported so be rotatable about its center axis and the semi-finished product 12 can be mounted on a top surface of the rotating table 71. Moreover, the core 72 is disposed coaxially with the rotating table 71, above the rotating table 71, and is supported to be rotatable about its center axis and to be movable in a direction of its center axis. Note that the outer diameter of the core 72 is smaller than the inner diameter d1 of the hollow hole 12c in the semi-finished product 12.

Furthermore, the dies 73a, 73b are arranged opposite to one another with the center axis of the rotating table 71 and the core 72 being at the center. In each of pairs of the dies 73a, 73b disposed opposite to one another, the dies are supported to come close and move away from each other in a radial direction of the rotating table 71 and the core 72 (semi-finished product 12). Front end surfaces of the dies 73a, 73b are formed as surfaces curved along an outer peripheral surface of the hollow stem portion 13b in the semi-finished product 13 subjected to the rotary swaging process.

When the semi-finished product 12 is to be shaped into the semi-finished product 13 by using the rotary swaging machine 70, as shown in parts (a) and (b) of FIG. 5, the semi-finished product 12 is first mounted on the rotating table 71 and then the core 72 is inserted into the hollow hole 12c of the semi-finished product 12. Next, the rotating table 71 and the core 72 are rotated in the same direction and the core 72 and the semi-finished product 12 are synchronously rotated. Then, the dies 73a, 73b are pressed against an outer peripheral surface of the hollow stem portion 12b in the rotated semi-finished product 12.

The semi-finished product 12 is thereby deformed in such a way that the outer diameter of the hollow stem portion 12b is reduced and the stem length of the hollow stem portion 12b is increased, and is shaped into the semi-finished product 13. At this time, as shown in part (d) of FIG. 2, the inner diameter, at a largest portion, of an enlarged-diameter hole portion 13d in the semi-finished product 13 is kept to be d2.

In other words, the hollow stem portion 12b of the semi-finished product 12 can be shaped into the hollow stem portion 13b of the semi-finished product 13 in advance before the necking process with a necking machine 90 to be described later, by performing the rotary swaging process with the rotary swaging machine 70 before the necking process. Accordingly, the hollow stem portion 13b can be easily controlled to have arbitrary dimensions. Moreover, setting the outer diameter of the core 72 and the curvatures of the front end surfaces of the dies 73a, 73b to arbitrary dimensions not only can make the thickness of the hollow stem portion 13b in the semi-finished product 13 uniform but also allows the thickness of the hollow stem portion 13b to be easily controlled such that the thickness is made larger or smaller than the thickness of the hollow stem portion 12b in the semi-finished product 12. Note that, depending on the dimensions of the semi-finished product 13, a rotary swaging process using no core 72 may be performed.

Figure 6:
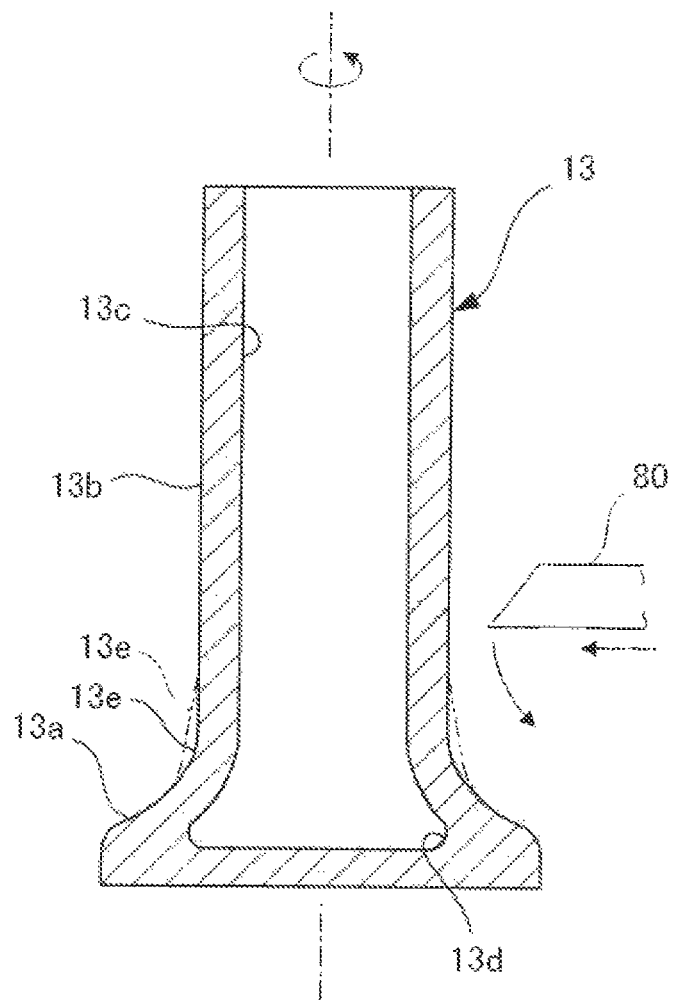
FIG. 6 is a view showing a cutting process performed on a neck portion of the semi-finished product.

Next, as shown in parts (d) and (e) of FIG. 2, and FIG. 6, the neck portion 13e of the semi-finished product 13 obtained by the rotary swaging process is subjected to the cutting process by using a tool 80.

Specifically, as shown in FIG. 6, an outer peripheral surface of the neck portion 13e in the semi-finished product 13 attached to a lathe turning machine (not illustrated) is cut with the tool 80 mounted on the lathe turning machine while the semi-finished product 13 is rotated about its axis. The outer peripheral surface of the neck portion 13e is thereby shaped in a round shape in which the thickness of the neck portion 13e is a predetermined thickness.

Cutting the outer peripheral surface of the neck portion 13e in the semi-finished product 13 and forming the neck portion 13e to have the predetermined thickness as described above can prevent an inner peripheral surface of the neck portion 13e from bulging inward in the necking process with the necking machine 90 to be described later.

In summary, as shown in part (d) of FIG. 2, a valve umbrella portion 13a, the hollow stem portion 13b, a hollow hole 13c which extends through the valve umbrella portion 13a and the hollow stem portion 13b, the enlarged-diameter hole portion 13d which is provided at an lower end of the hollow hole 13c in the valve umbrella portion 13a, and the neck portion 13e which is a connection portion between the valve umbrella portion 13a and the hollow stem portion 13b are formed in the semi-finished product 13 subjected to rotary swaging process. Furthermore, as shown in part (e) of FIG. 2, the thickness of the neck portion 13e is adjusted in the semi-finished product 13 subjected to the cutting process.

The valve umbrella portion (semi-finished product valve umbrella portion) 13a, the hollow stem, portion (semi-finished product hollow stem portion) 13b, the hollow hole (semi-finished product hollow hole) 13c, the enlarged-diameter hole portion (semi-finished product enlarged-diameter hole portion) 13d, and the neck portion (semi-finished product neck portion) 13e in the semi-finished product 13 correspond respectively to the valve umbrella portion 10a, the hollow stem portion 10b, the hollow hole 10c, the enlarged-diameter hole portion 10d, and the neck portion 10e in the valve body 10 which is the finished product.

Figure 7:
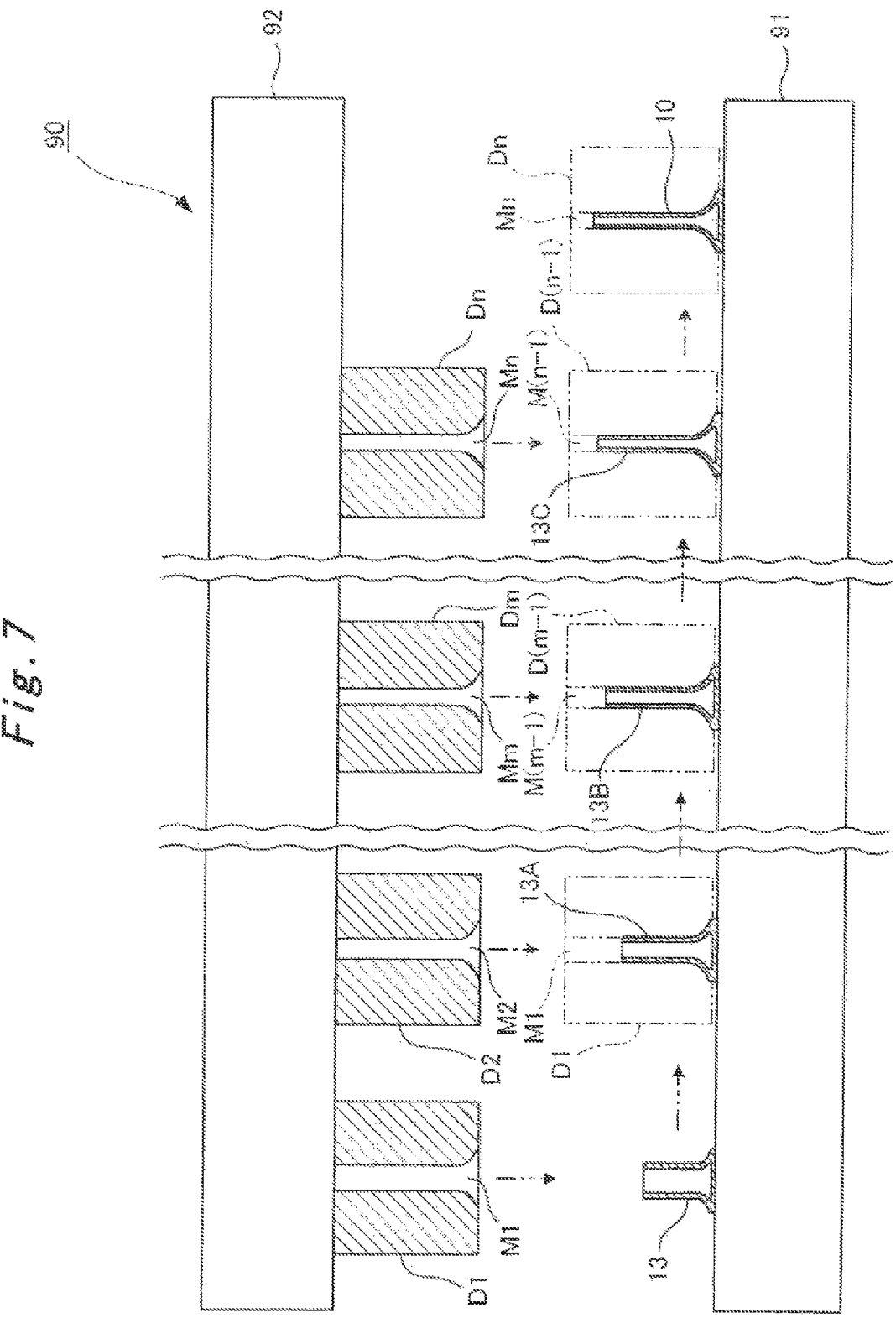
FIG. 7 is a schematic configuration view of a necking machine and is a view showing operations of shaping the semi-finished product into the valve body.

Next, as shown in parts (e) and (f) of FIG. 2, and FIG. 7, the semi-finished product 13 obtained by the cutting process is shaped into the valve body 10 by using the necking machine 90 for cold forging or warm forging.

As shown in FIG. 7, the necking machine 90 draws the hollow stem portion 13b and the neck portion 13e of the semi-finished product 13 stepwise, and eventually shapes the semi-finished product 13 into the valve body 10. A bed 91 is provided in a lower portion of the necking machine 90 and a movable mount 92 is supported above the bed 91 to be capable of being lifted and lowered.

Moreover, tubular n dies D1, D2, . . . , D(m−1), Dm, . . . , D(n−1), and Dn are provided on a bottom surface of the movable mount 92 along a conveyance direction of the semi-finished product 13. Here, index m raters to m-th in the order and index n refers to n-th (last) in the order. Moreover, m<n is satisfied and m and n are each a positive integer larger than 3.

Furthermore, shaping holes M1, M2, M(m−1), Mm, M(n−1), and Mn each having a circular cross-section are opened downward respectively in center portions of the dies D1, D2, D(m−1), Dm, D(n−1), and Dn. The shaping holes M1, M2, M(m−1), Mm, M(n−1), and Mn are formed such that the inner diameters thereof are gradually reduced as the shaping holes are located more downstream in the conveyance direction.

Meanwhile, the semi-finished product 13 and the valve body 10 can be conveyed to and positioned at positions corresponding to the shaping holes M1, M2, M(m−1), Mm, M(n−1), and Mn, on the top surface of the bed 91 by conveyance means (not illustrated).

When the semi-finished product 13 is to be shaped into the valve body 10 by using the necking machine 90, as shown in FIG. 7, the semi-finished product 13 is first placed at a predetermined position on the bed 91 which is most upstream in the conveyance direction. Then, the conveyance and positioning operation of the aforementioned conveying means and the lowering and lifting operation of the movable mount 92 are performed alternately to perform n times of necking process with the dies D1, D2, D(m−1), Dm, D(n−1), and Dn. The semi-finished product 13 is thereby eventually shaped into the valve body 10 which is the finished product while the shape of the semi-finished product 13 is changed to, for example, the shapes of semi-finished products 13A, 13B, 13C.

At this time, in the process where the semi-finished product 13 is shaped into the semi-finished products 13A to 13C and then into the valve body 10, the outer diameter of the hollow stem portion 13b and the inner diameter of the hollow hole 13c are gradually reduced while the stem length of the hollow stem portion 13b is gradually increased. In addition, the neck portion 13e whose outer peripheral surface has the predetermined round shape is eventually deformed into the neck portion 10e having a predetermined thickness while the thickness of the neck portion 13e is gradually changed.

Moreover, since the valve umbrella portion 13a in each of the semi-finished products 13 and 13A to 13C is not in contact with insides of the shaping holes M1, M2, M(m−1), Mm, M(n−1), and Mn, the inner diameter, at a largest portion, of the enlarged-diameter hole portion 13e in each of the semi-finished products 13 and 13A to 13C and the inner diameter, at a largest portion, of the enlarged-diameter hole portion 10e in the valve body 10 are kept to be d2.

Next, as shown in FIG. 1, the metallic sodium N is put into the hollow hole 10c of the valve body 10 obtained by the necking process and the stem end sealing member 20 is joined to an end portion of the hollow stem portion 10b to close the hollow hole 10c. The hollow engine valve 1 can be thus obtained.

In the embodiment described above, the enlarged-diameter hole portion 12d is formed by performing the cutting process on the hollow hole 12c on the semi-finished product 12 subjected to the hot forging. However, the enlarged-diameter hole portion 13d may be formed by performing a process cutting of the hollow hole 13c on the semi-finished product 13 subjected to the rotary swaging process or on the semi-finished product 13 subjected to the cutting process on the neck portion 13e.

Moreover, in the embodiment described above, as the method for producing the valve body 10, the semi-finished product 12 is sequentially subjected to the cutting process on the hollow hole 12c in the valve umbrella portion 12a, the rotary swaging process on the hollow stem portion 12b, the cutting process on the neck portion 13e, and the necking process on the hollow stem portion 13b and the neck portion 13e. However, depending on a valve characteristic of the hollow engine valve 1, it is possible to use a production method in which the cutting process on the hollow hole 12c in the valve umbrella portion 12a and the cutting process on the neck portion 13e are omitted.

Moreover, no metallic sodium N may be put onto the hollow engine valve 1 depending on a usage environment thereof.

In the method for producing the hollow engine valve 1 of the present invention, the solid round bar 11 which is the raw material of the valve body 10 is shaped into the semi-finished product 12 by performing the hot forging once and then the semi-finished product 12 is shaped into the semi-finished product 13 and then into the valve body 10 which is the finished product. This can simplify production steps and improve processing accuracy.

Moreover, in the rotary swaging process, the onset peripheral surface of the hollow stem portion 12b of the semi-finished product 12 is pressed by the dies 72a, 72b with the core 72 being inserted in the hollow hole 12c of the semi-finished product 12. This can make the thickness of the hollow stem portion 12b (hollow stem portion 13b) uniform. Furthermore, scratches and dents on an inner peripheral surface of the hollow hole 12b which are formed in the hot forging can be removed. Accordingly, when the metallic sodium N is put into the hollow engine valve 1, the fluidity of the metallic sodium. N can be improved. This can improve the thermal conductivity of the hollow engine valve 1.

Furthermore, the enlarged-diameter hole portion 10d of the valve body 10 aimed at reducing the weight and improving the thermal conductivity is formed in advance as the enlarged-diameter hole portion 12d in the shaping of the semi-finished product 12. Since the inner diameter of the hollow hole 12c is larger than the inner diameter of the hollow hole 10c, the enlarged-diameter hole portion 12d can be easily processed.

In addition, the thickness of the neck portion 13e is adjusted before the necking process by cutting the outer peripheral surface of the neck portion 13e of the semi-finished product 13 in such a way that the outer peripheral surface has the predetermined round shape. The thickness of the neck portion 13e of the semi-finished product 13 (semi-finished products 13A to 13C) can be thus easily adjusted in the necking process. Accordingly, the neck portion 10e in the valve body 10 can be easily formed to have the predetermined thickness.

INDUSTRIAL APPLICABILITY

According to the method for producing the hollow engine valve of the present invention, the hollow engine valve which is light weight and which has excellent heat resistance can be easily produced. Accordingly, the present invention can be useful in the automobile industry and the like.

The invention claimed is:
1. A method for producing a hollow engine valve including a valve body in which a hollow hole extending through a valve umbrella portion and a hollow stem portion connected to the valve umbrella portion is formed, characterized in that the method comprises:

shaping a solid round bar which is a raw material of the valve body into a valve body semi-finished product in which a semi-finished product hollow hole is formed, by performing hot forging once without forming a step in a semi-finished product hollow hole by insertion of a core, the semi-finished product hollow hole corresponding to the hollow hole and formed to extend through a semi-finished product valve umbrella portion corresponding to the valve umbrella portion and a semi-finished product hollow stem portion corresponding to the hollow stem portion;

subjecting the valve body semi-finished product to a rotary swaging process in which an outer peripheral surface of the semi-finished product hollow stem portion is pressed while the valve body semi-finished product is rotated, and thereby reducing a diameter of the semi-finished product hollow stem portion and increasing a stem length of the semi-finished product hollow stem portion;

subjecting the valve body semi-finished product subjected to the rotary swaging process to a necking process in which the semi-finished product hollow stem portion and a semi-finished product neck portion being a connection portion between the semi-finished product valve umbrella portion and the semi-finished product hollow stem portion are drawn stepwise, and thereby reducing the diameter of the semi-finished product hollow stem portion and increasing the stem length of the semi-finished product hollow stem portion to shape the valve body semi-finished product into the valve body; and joining a stem end sealing member to an end portion of the hollow stem portion in the valve body to seal the hollow hole.

2. The method for producing the hollow engine valve according to claim 1, characterized in that a semi-finished product enlarged-diameter hole portion having an inner diameter larger than an inner diameter of the semi-finished product hollow hole is processed at a lower end of the semi-finished product hollow hole in the semi-finished product valve umbrella portion.

3. The method for producing the hollow engine valve according to claim 1, characterized in that the semi-finished product neck portion is processed to have a predetermined thickness before the necking process.

4. The method for producing the hollow engine valve according to claim 1, characterized that the stem end sealing member is joined to the end portion of the hollow stem portion after metallic sodium as a coolant is put into the hollow hole.

5. The method for producing the hollow engine valve according to claim 1, characterized in that, just after the hot forging, a semi-finished product enlarged-diameter hole portion having an inner diameter larger than an inner diameter of the semi-finished product hollow hole is processed at a lower end of the semi-finished product hollow hole in the semi-finished product valve umbrella portion, from an inside of the semi-finished product hollow hole.

6. The method for producing the hollow engine valve according to claim 1, characterized in that an outer peripheral surface of the semi-finished product neck portion is cut before the necking process such that a thickness of the semi-finished product neck portion becomes a predetermined thickness.

* * * * *